Oct. 17, 1961     J. C. GREY     3,004,409
FLEXIBLE COUPLING

Filed July 17, 1959     2 Sheets-Sheet 1

Inventor
John Constantine Grey

By Baldwin & Wight
Attorneys

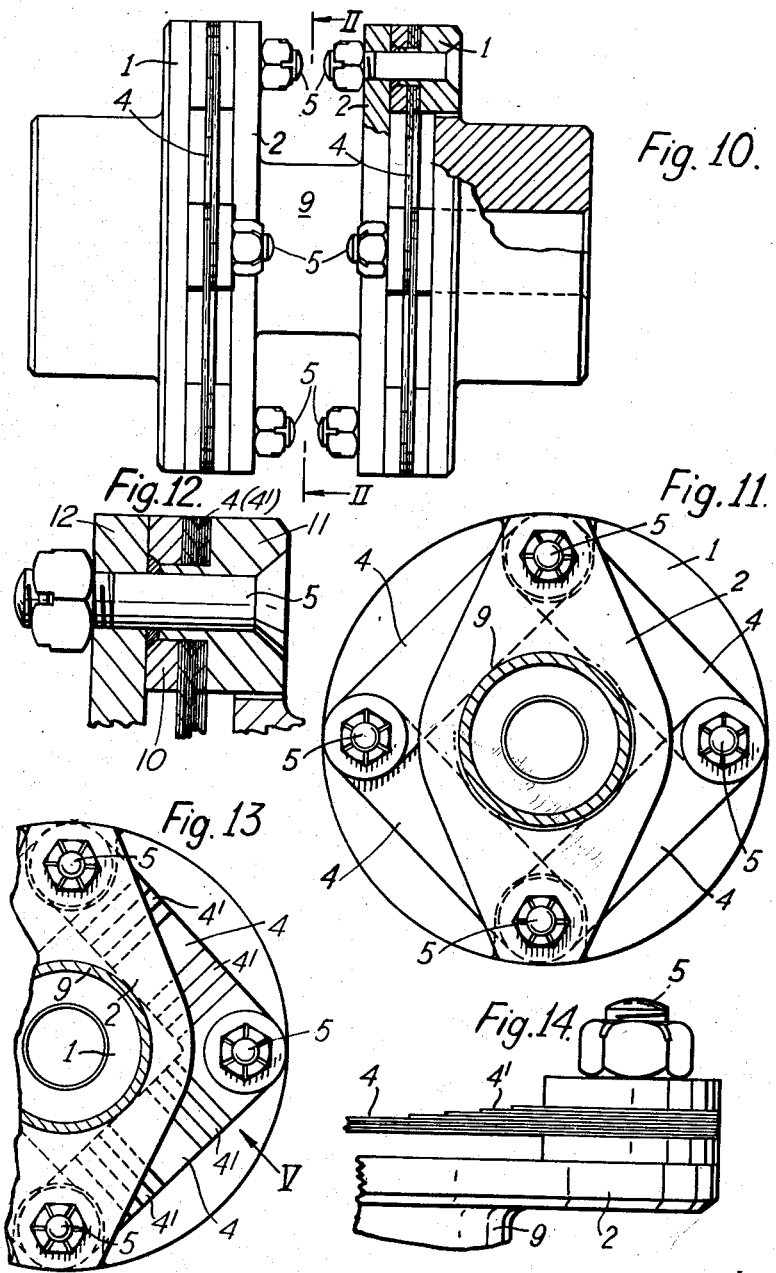

United States Patent Office 3,004,409
Patented Oct. 17, 1961

3,004,409
FLEXIBLE COUPLING
John Constantine Grey, Osterley, England, assignor to Turbomachines Limited, Staines, England
Filed July 17, 1959, Ser. No. 827,743
Claims priority, application Great Britain, July 31, 1958
1 Claim. (Cl. 64—12)

This invention relates to flexible couplings of the all metal kind and devoid of sliding parts: such couplings permit power to be transmitted from one shaft to another under conditions of limited angular and radial misalignment and also prevent the transmission of excessive axial forces from one shaft to another when relative movements take place under operating conditions.

The main object of the present invention is to provide in a coupling of given overall dimension a construction enabling an increase in the permissible misalignment, an increase in the permissible torque transmitted and a reduction in the axial force transmitted for a given axial deflection.

Now according to the present invention, a flexible coupling comprises two components adapted respectively to be connected to or forming part of the angularly moveable parts to be coupled and these two components are coupled to one another by links of resilient metal themselves articulated respectively to the two components along a pitch circle about the axis of angular movement. In this way the line of load on the links is tangential or in other words is one of tension in the links, which can therefore be of relatively small cross-section.

A single such coupling can be arranged to connect the angularly moveable parts: however two (or more) single couplings could be used in series and in such a case the end components connected to the parts would be coupled to one another by an intermediate component which is coupled through similar links and components.

Figure 7:
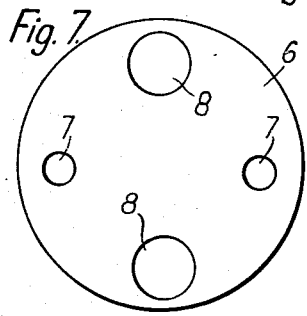
Figure 4:
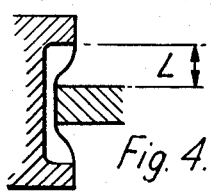
Figure 5:
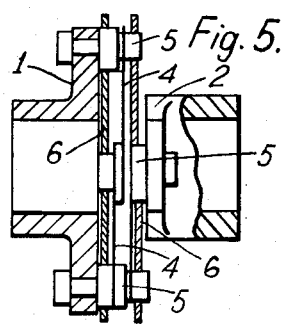
Figure 6:
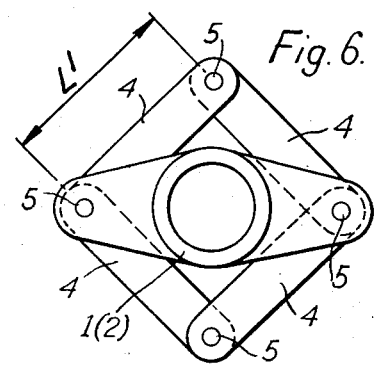
Figure 8:
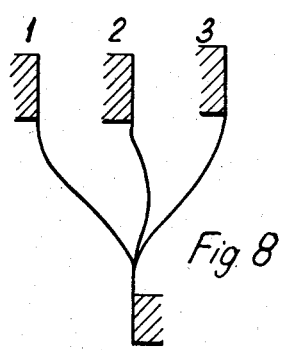
Figure 9:
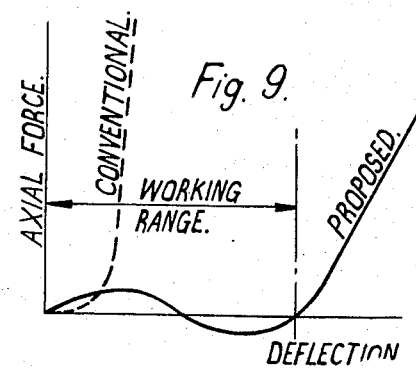

The invention is illustrated in the accompanying drawings. FIGURES 1–4 are diagrammatic views of conventional kinds of flexible coupling, FIGURES 5–7 are views of a coupling according to this invention and FIGURES 8 and 9 are diagrams prepared to show the advantages of a construction according to the invention. FIGURES 10 and 11 are views of a practical construction, FIGURE 10 being an elevation with some parts broken away and shown in section, FIGURE 11 being a section on the line II—II of FIGURE 10, and FIGURES 12, 13 and 14 being views of a modified form of link, FIGURE 14 being a local elevation as seen in the direction of the arrow V in FIGURE 13.

Figure 1:
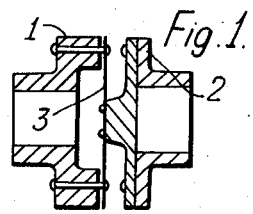
Figure 2:
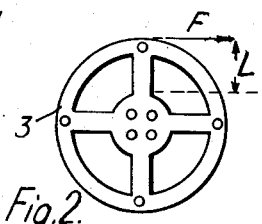

FIGURE 1 shows diagrammatically the principle of a flexible coupling. Two rigid hubs 1, 2 adapted to be secured respectively to the driving and driven shafts, are connected by one or more thin flexible metallic plates 3 having typical forms shown in FIGURES 2 and 3. In FIGURE 2 the flexible plate is of the spoke form shown in order to increase the flexibility which otherwise would be inadequate. From the point of view of torque transmission, the torque arm has a length L, under a force F. The weakness of this form of flexible plate lies in the fact that the arm being thin buckles easily and is thus unable to sustain a large force F. Furthermore, as in practice the length L is comparatively small, the permissible deflection small.

Figure 3:
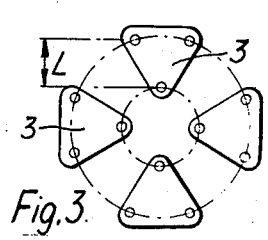

FIGURE 3 shows an attempt to shape the flexible plates 3 so that torque is transmitted through a tensile force in the plate rather than by bending as in the spoke shape shown in FIGURE 2. The disadvantage of the form shown in FIGURE 3 is that with plates approximately as shown in FIGURE 3, the tensile forces induced are high but the axial flexibility is low.

Referring now to the construction shown in FIGURES 5 and 6 which illustrate a construction according to the invention each hub 1, 2 has two points of suspension the lines of which are at right angles to each other, thus forming a "cardan" suspension. The four points are interconnected by resilient metal links 4 which are pivotally connected at their opposite ends to the hubs or heads 1, 2 by pins 5, lying on a pitch circle about the axis of angular movement of the hubs. It will be seen that for a given coupling diameter the arm length L' of the arrangement shown in FIGURES 5 and 6 is appreciably greater than the arm length L of normal arrangement shown in FIGURES 2 and 3. Furthermore the links 4 work in tension only and not in bending, and for a given torque, the tensile force induced in the links is smaller than that of an arrangement as shown in FIGURE 3. Thus for a given plate stress the coupling of this invention as shown in FIGURES 5 and 6 can transmit a larger torque, and its ability to sustain angular misalignment is greater by virtue of the fact that the length L' of the links 4 is greater than the length L of the usual arrangement shown in FIGURES 2 and 3.

Axial flexibility can be obtained within fairly wide limits without any appreciable axial force being transmitted by elastic deflection of the links. Alternatively if the natural length L' of the flexible links 4 is made slightly, e.g. a few thousandths of an inch greater than the centre distance of the corresponding pins 5 in the hubs, the links will be under compression when the coupling is not transmitting torque. As the thin links are unable to carry compressive loads, they buckle as shown diagrammatically in position 2 of FIGURE 8: positions 1 and 3 of that figure show the links with "slack" taken up on either side of the mean position 2. FIGURE 9 shows the curve plotting axial force against deflection of the conventional coupling and of the coupling according to the invention. The axial forces in the latter case in the transition from position 1 to 3 are negligible and reverse their sign as shown in FIGURE 9. Further deflection beyond position 3 proceeds at a constant spring rate lower than in the conventional coupling. The working range from 1 to 3 is quite adequate for all practical purposes so that the arrangement virtually makes the axial flexibility infinite within the stated range.

In the event of failure of the flexible links 4 it is desirable that the drive should continue temporarily: similarly in the case where a double joint is used (i.e., two sets of links as shown in FIGURE 10 connected in line so that the head 2 is interposed between two heads 1). In both constructions middle portion must be secure. This is achieved as is shown in FIGURES 5–7 by providing circular plates 6 having openings 7 spigoting on the two driving pins 5 and having clearance holes 8 for the driven pins 5. These plates 6 are thus normally disengaged and only take up the drive in an emergency.

Referring now to FIGURES 10 and 11 these figures show a construction providing a double flexible coupling each part of which follows the construction shown in FIGURES 5 and 6. Thus each coupling comprises heads 1 and 2, the heads 2 being connected to form an intermediate piece by the distance piece 9. The heads 2 are connected to the heads 1 by the flexible links mounted at their ends on the pins 5 carried by the heads 1 and 2. In the construction shown the security plates 6 are not employed.

The links 4 can be in the form of a single thickness of metal but as is shown most clearly in FIGURES 10 and 11, they would usually be of laminated form.

As is shown in FIGURES 12, 13 and 14, the laminated links 5 can be given increased thickness at their extremities where they are mounted on the pins 5: this can be achieved by the fitting of laminae 4' of decreasing length and lying over the laminae 4 at their connection to the pins 5.

Although in the drawings, the various links 4 are shown as separately formed, precisely the same benefits can be obtained by forming the links as the marginal part of a single frame shaped piece having a shape depending on the number of links required: thus, in the arrangements shown which employ four links 4 the frame would be of square form, the four sides of the frame providing respectively the four links required, the frame having holes for the pins 5 at its corners. As is shown in FIGURE 12 the links 4 can be carried permanently on bush extensions 10 of a carrier ring 11 so as to form therewith a single self-contained unit with the laminations held between the ring 11 and a ring 12: this unit already pre-assembled, can easily be fitted to the components 1, 2 so avoiding the time consuming operation of assembling the various laminations individually on their various pivots.

I claim:

A flexible torque transmitting coupling comprising a first component adapted to be connected to a rotatable driving part; a second component adapted to be connected to a driven part rotatable normally about an axis substantially coincident with the driving part axis of rotation; spaced pivot pins on said first component deployed on a pitch circle around the common axis of said rotatable parts; other spaced pivot pins on said second component deployed on said pitch circle and intervening between the spaced pivot pins on said first component; and a plurality of substantially flat links having their opposite ends pivotally mounted respectively on pairs of pivot pins which are adjacent each other around said pitch circle and which are respectively on said first and second components.

References Cited in the file of this patent

UNITED STATES PATENTS

| 1,145,602 | Lieber | July 6, 1915 |
| 2,181,888 | Gustin | Dec. 5, 1939 |
| 2,430,449 | Brown | Nov. 11, 1947 |
| 2,431,409 | Mart | Nov. 25, 1947 |
| 2,858,681 | Smirl et al. | Nov. 4, 1958 |

FOREIGN PATENTS

| 437 | Great Britain | Mar. 11, 1915 |
| 172,178 | Great Britain | Dec. 8, 1921 |
| 628,664 | Great Britain | Sept. 2, 1949 |
| 733,885 | Great Britain | July 20, 1955 |